Nov. 28, 1944.  P. H. THOMPSON  2,363,705
REFRIGERATING MECHANISM
Filed Feb. 28, 1942  2 Sheets-Sheet 1
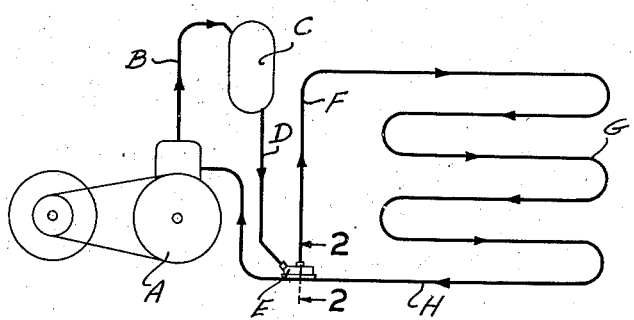
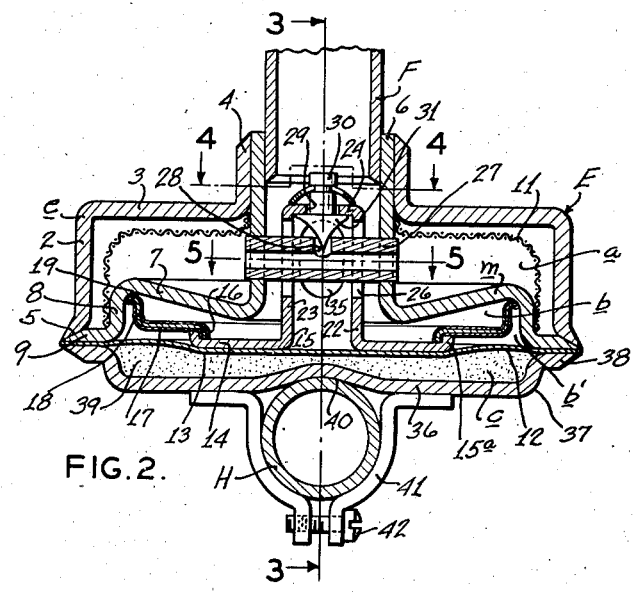
INVENTOR.
PARKE H. THOMPSON
BY
ATTORNEY

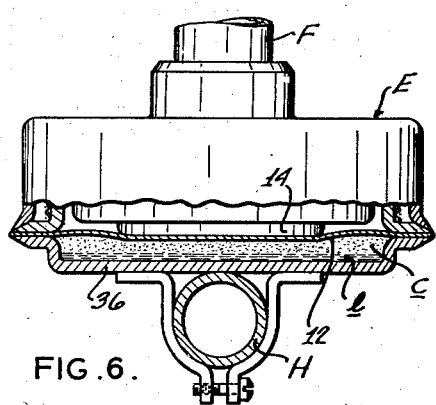
FIG.6.
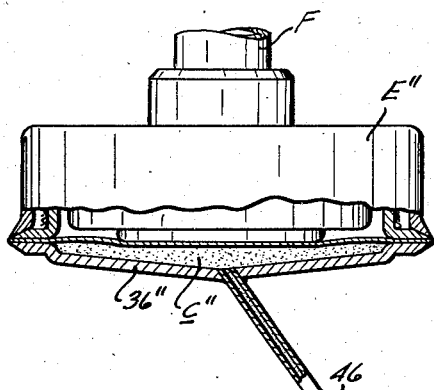
FIG.9.
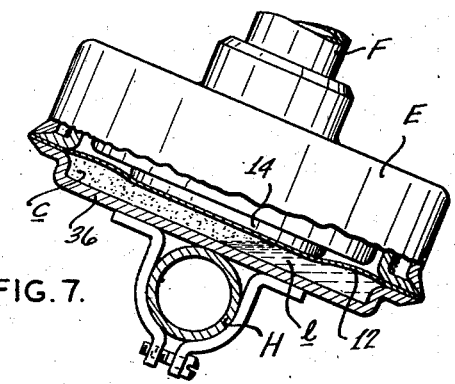
FIG.7.
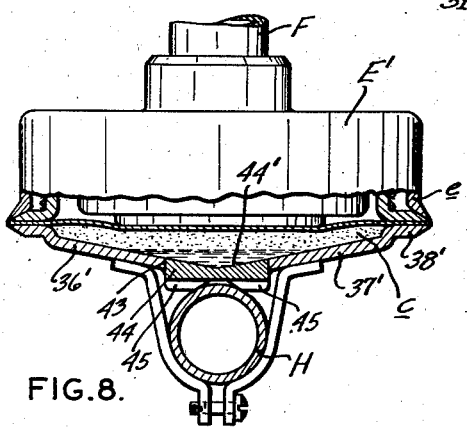
FIG.8.
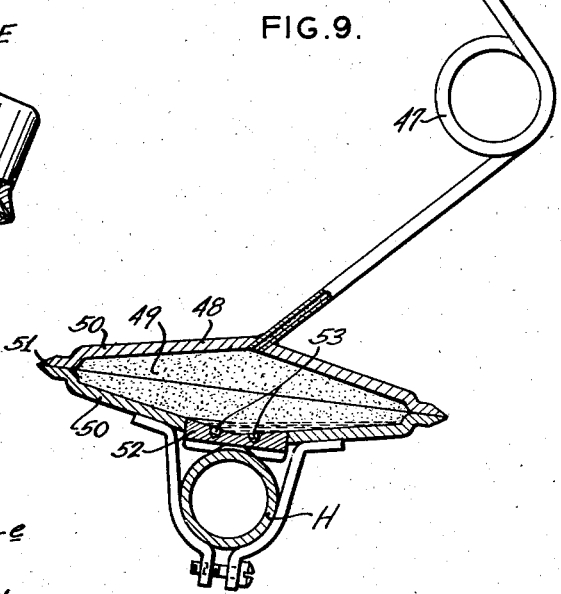
INVENTOR.
PARKE H. THOMPSON
BY
ATTORNEY Patented Nov. 28, 1944

2,363,705

UNITED STATES PATENT OFFICE 2,363,705

REFRIGERATING MECHANISM

Parke H. Thompson, Glendale, Mo.

Application February 28, 1942, Serial No. 432,755

7 Claims. (Cl. 62—8)

This invention relates generally to expansion valves and, more particularly, to a certain new and useful improvement in thermostatically controlled expansion valves particularly adapted for use in connection with refrigeration systems; and this application is a continuation-in-part of my co-pending application for Control valves, filed May 8, 1939, Serial No. 272,372.

My invention has for its primary objects the provision of a control valve of the type stated which is simple, compact, rugged, and durable in structure, which may be economically constructed, which may be applied directly to the point of temperature control, which is capable of maintaining accurate control over a relatively wide range of load conditions and temperature characteristics, which obviates the use and employment of remotely located thermostatic control elements, and which is highly efficient in the performance of its intended functions.

My invention has for a further object the provision of a control device of the type stated which may be constructed upon a production basis and charged with a temperature responsive substance without necessitating particular adjustment for a particular use or application, while at the same time lending itself readily to very simple and expedient adjustment when installed with a particular refrigerating system and which may readily and conveniently be adjusted at the time of application both as to its temperature range and its sensitivity merely by varying the angular position in which it is placed during such installation.

And with the above and other objects in view, my invention resides in the novel features of form, construction, arrangement, and combination of parts presently described and pointed out in the claims.

In the accompanying drawings (two sheets),

Figure 1 diagrammatically illustrates a control valve embodying my present invention in operative relation with a refrigeration system;

Figure 2 is an enlarged sectional view of the valve, taken approximately along the line 2—2, Figure 1;

Figure 3 is a similar view of the valve, taken approximately along the line 3—3, Figure 2;

Figures 4 and 5 are transverse sectional views of the valve, taken along the lines 4—4 and 5—5, respectively, Figure 2;

Figure 6 is an enlarged sectional view of a valve substantially similar to the valve shown in Figure 2, illustrating in more specific detail a temperature responsive charge which is partly in liquid and partly in gaseous form over the temperature range for which the valve is to establish control;

Figure 7 is a sectional view of the valve shown in Figure 6, illustrating the manner in which the sensitivity and range may be varied by tilting the valve; and Figures 8 and 9 are enlarged sectional views of modified forms of control valves constructed in accordance with and embodying my present invention.

Referring now in more detail and by reference characters to the drawings, which illustrate practical embodiments of my invention, A designates a compressor of any standard or approved type, disposed and arranged for discharging liquid refrigerant through a line B to a suitable condenser-receiver C, which latter, in turn, functions to deliver and supply the refrigerant through a line D to a control valve E of my invention. From the valve E, the liquid refrigerant is directed through a line F into the particular evaporator system G, for return in due course through a suction line H to the compressor A, all as best seen in Figure 1.

The valve E preferably comprises a rigid outer somewhat bell-shaped shell or housing e, which is constructed of any suitable, preferably metallic, material, and which includes an annular side wall 2 and an end wall 3 centrally provided with a laterally presented neck 4, the shell wall 2 preferably flaring outwardly and being chamfered at and along its free margin, as at 5, in the provision of a weld-seat for purposes presently appearing.

Co-operable with the shell e in the formation of an intake or strainer chamber a, is a wall-providing member m, which includes a tubular portion or duct 6 welded or otherwise fixed within, and extending into the shell e co-axially through, the neck 4, the duct 6 being sized for accommodating, and for welded or otherwise hermetically sealed connection with, an end-portion of the evaporator inlet-pipe F. At the inner end of the duct 6 within the shell e, the member m is extended first outwardly toward the shell wall 2 and then laterally toward the shell end wall 3 in the provision of an opposite end wall portion 7. The member m then adjacent the shell wall 2 is integrally bent or otherwise formed to provide an annular or ring portion 8 disposed approximately in parallel relation to the shell wall 2. From the outer margin of the ring 8, the member m is further extended in the provision of a lateral chamber and wall completing flange 9, which is disposed approximately in the plane of, and at its outer margin complementarily chamfered for welded or other fixed connection with the shell wall 2 at, the weld-seat 5, all as best seen in Figures 2 and 3.

Suitably located upon, and opening into the chamber a of, the shell e, is an inlet tubular or pipe extension 10 adapted for conventionally receiving the refrigerant supply line D, and so arranged annularly about the duct 6 and disposed within the intake chamber a preferably in complementarily shaped relation to the inner face of the housing e for straining all incoming refrigerant, is a suitable screen or the like 11.

Marginally secured to and upon the outer face of the end wall flange 9 and intermediately disposed in spaced relation over, and forming an outlet chamber b with, the chamber end wall m, is a diaphragm 12 centrally deformed, as at 13, for co-operably receiving an annular pressure disk or plate 14 centrally apertured, as at 15, and laterally flanged, as at 15a, along its outer periphery for engagement with a companion oppositely disposed annular flange 16 upon the inner periphery of a flat annular spring 17, in turn, provided upon its outer periphery with an oppositely disposed lateral rim 18 curled or bent over along its free margin in the provision of an arcuate lip 19 for rocking abutment against the arcuate corner-face of the chamber end wall m provided by its portions 7—8 and thereby providing an auxiliary chamber b' within the outlet chamber b.

The rim 18 of the annular spring 17 is provided with a relatively small aperture or orifice 20 for communicating the outlet chamber b and the auxiliary member b', as best seen in Figure 3 and for purposes presently more fully appearing, and, as also presently more fully appearing, the spring 17 functions to bias the valve in the closing direction and control the difference in pressure above and below the diaphragm 12 required to open the valve to a load satisfying position. The spring 17 may or may not be sheathed in some resilient plastic substance, such as Neoprene, to improve its sealing properties in keeping evaporating refrigerant from the upper side of diaphragm 12.

Formed preferably integrally with, and extending laterally from, the pressure disk 14 about the margin of its aperture 15, is a pin-carrying member 22 preferably of rectangular cross-section, the member 22 having four side walls 23 and a top or end wall 24 and having a diagonal dimension substantially equal to the inside diametral size of the duct 6 for slidable or shiftable engagement at its longitudinal corners 25 with the inner face of the duct 6, all as best seen in Figure 4.

In two of its opposed side walls 23, the pin-carrying member 22 is provided longitudinally with suitably elongated registering apertures 26 for loosely embracing a transverse tube 27 extending diametrically across the duct 6, the tube 27 being at its ends securely mounted in, and projecting through the side walls of, the duct 6 for communication with the intake or strainer chamber a. At a suitable location upon its wall within the bore of the pin-carrying member 22, the tube 27 is cut away or apertured, as at 28, in the provision of a valve-seat, all as best seen in Figures 2 and 3 and for purposes presently appearing.

In its end wall 24, the member 22 is provided with a preferably circular aperture 29 disposed in co-axial alignment with the valve-seat aperture 28, and loosely extending through the aperture 29, is a valve-pin 30 preferably integrally provided at its inner end with a conical valve-point 31 for seating in the tube 27 at its aperture 28. Adjacent its upper or outer end, the valve-pin 30 is provided with an annular groove 32 for retentive engagement by inwardly presented tongues 33 upon a cupped spring washer 34 having abutting engagement along its outer peripheral margin with the outer face of the pin carrier end wall 24 for permitting the valve-point 31 to center itself automatically in the valve-seat 28 when the valve-pin 30 is in closed position, all as best seen in Figures 3 and 4.

In its other side walls 23, the valve-pin carrier 22 is provided with opposed registering apertures 35 for permitting free flow of the refrigerant from the valve-seat aperture 28 into the duct 6 and thence through the line F to the evaporator G.

36 designates an end cap, which is cupped or peripherally deformed, as at 37, and provided marginally with an annular flange 38 for overlying abutment upon the peripheral portion of the outwardly presented face of the diaphragm 12, in which position the cap 36 is tightly secured and sealed preferably by welding in the formation with the diaphragm 12 of a sealed chamber c, which is partially filled with a suitable thermal-charge in the nature of temperature-responsive medium 39, such as an expansible liquid, vaporizable liquid, gas, or the like. It will, of course, be evident that, instead of welding, the shell flange 5, the chamber end wall flange 8, the diaphragm 12, and the cap-flange 38 may be conventionally provided with a suitable number of annular gaskets and bolted or otherwise tightly secured together.

The end cap 36 is further preferably provided with a shallow inwardly depressed diametral channel 40 for seating engagement with the return or suction line H of the evaporator G, and welded or otherwise rigidly secured upon the outer face of the end cap 36 on opposite sides of the channel 40, is a pair of suitable clamp straps 41 each provided with a clamping bolt 42 for securely retaining the entire valve structure E in operative position.

In operation, the valve E is clamped to the suction line H in a position such that the temperature-responsive substance 39 in the chamber c is in direct contact with the end cap 36. With an increase in suction temperature, the temperature-responsive substance 39 in the chamber c expands, deflecting the diaphragm 12 and the pressure plate 14 inwardly against the tension of the spring 17 and the pressure in chambers b, b'. As the pressure plate 14 is deflected or shifted inwardly, the pin-carrier 22 is also shifted inwardly and the valve-point 31 moved out of engagement with its seat 28.

The refrigerant meanwhile has flowed from the liquid receiver C through the intake line D and through the strainer 11 into the chamber a. As the seat-forming aperture 28 is opened by the withdrawal of the valve-point 31, the refrigerant flows through the tube 27, the aperture 28, and the aperatures 26, 35, of the pin-carrier 22 into the outlet chamber b and then through the line F and system G.

The refrigerant, on flowing through the aperture 28, expands, and a certain amount of so-called flash gas is formed, which forces its way into the chamber b and through the spring aperture 20 into the chamber b', forming a so-called "vapor lock," thereby functioning as an insulating medium to prevent any of the cold expanding refrigerant from coming in contact with the diaphragm 12.

As was previously pointed out, the chamber c is provided with any suitable thermal-charge and, as is well recognized in the refrigeration industry, the most commonly employed thermal-charges consist of a quantity of the refrigerant itself introduced into the chamber at some selected temperature and pressure. In connection with the present invention, it must be borne in mind that the pressure exerted upon a diaphragm by a refrigerant charged thermal element corresponds to the average temperature on the surface of the liquid component of that charge. It will thus be evident that, when the valve E is provided with such a thermal-charge and is mounted by means of the clamp straps 41 upon the suction line H, the liquid rests upon the upwardly presented inner face of the cap 36, creating another or auxiliary insulating gaseous layer upon the under side of the diaphragm, augmenting the insulating action of the vapor lock.

Conversely, with a reduction in temperature of the suction gas, the pressure exerted upon the diaphragm 12 by the temperature-responsive medium 30 will be reduced and the pressure plate 14 will move downwardly under the influence or bias of the spring 17 and the pressure in chambers b, b', seating the valve-point 31 and thereby restricting the seat-forming aperture or orifice 28 and cutting off or reducing the flow of refrigerant to the evaporator G.

It should be specifically noted that the expansion of the refrigerant through the valve-seat aperture 28 takes place within the confines of the duct 8, which is entirely surrounded by the inlet chamber a. In addition, the portions of the outlet chamber b which are adjacent the diaphragm 12 are in intimate heat-interchanging relationship with the inlet chamber a across the wall-forming member 7. Consequently, the warm supply refrigerant in the chamber a maintains the exteriorly exposed portions of the valve in relatively warm condition, thereby preventing the formation of any frost or otherwise materially interfering with the proper functioning and operation of the valve.

As is well known, thermally responsive substances which are used in thermometers, thermovalves, and other temperature-sensitive devices depend for their effectiveness upon either changes in vapor pressure or physical expansion and contraction responsive to the particular change being measured. For example, the mercury in the tube of a thermometer depends for its effect upon its physical expansion, a characteristic possessed by practically all liquids and solids and one which may be measured in terms of a constant coefficient. The same is true of gases within the limits of the operation of Boyle's law. For vaporizable liquids, however, there is an intermediate range in which the physical pressure exerted by the liquid will vary responsive to temperature changes as a function of the vapor pressure of the liquid. This latter phenomenon is also characteristic of certain fluids and solids, which either sublime and, therefore, exhibit a vapor pressure, or which contain absorbed gases and, therefore, exhibit a vapor pressure.

Accordingly, I have found that I may charge the chamber c of the valve E with a quantity of a vaporizable liquid, a liquid containing an absorbed gas, or a solid containing an absorbed gas, the volume of such charge being normally somewhat smaller than the overall volume of the chamber, so as to permit a free gas space within the chamber above the charge of thermally temperature-responsive substance or substances. For example, in Figure 6 I have shown the valve E partially filled with a temperature-responsive liquid l. When the valve E is disposed in truly horizontal position (it being understood that by "horizontal" I means a general plane of reference more or less commonly understood as being parallel to the ground or floor, that is to say, at right angles to the "vertical" line of the force of gravity), as shown in Figure 6, its operation will be substantially that described above in connection with the valve shown in Figure 2. The condensation into liquid particles will occur on the underside of the diaphragm 12 due to the thermal conductivity of the element 14 and drop off into the liquid still remaining on the upper surface of the cap 36, thus becoming again responsive to the temperature of the suction line H. This continuous condensation and re-evaporation of the charge l provides a gas-liquid phase relationship which makes it possible to change the basic characteristic or range of the valve E merely by tilting it somewhat along the longitudinal axis of the suction tube H to decrease the area of the gas-liquid inter-face, as shown in Figure 7.

In Figure 8, I have shown a modified form of control valve E', which is substantially identical in all respects to the valve E, except that it is provided with an end cap 36' which is conically dished or cupped, as at 37', and provided with an annular flange 38' for welded securement to the valve shell or housing e. The end cap 36' is preferably formed of stainless steel or some other material having a relatively low coefficient of thermal conductivity and is centrally apertured, as at 43, for receiving a periphery welded or otherwise hermetically secured insert 44 formed of copper or some other suitable material having a relatively high thermal conductivity and provided upon its under face with downwardly projecting spaced ears 45 for straddlewise seated engagement upon the return or suction line H.

By employing this so-called composite end cap with metals chosen for their relatively low and high thermal conductivities, the speed of response of the thermostatic substance may be very sensitively adjusted and changed by tilting the valve structure, so that a greater or lesser portion of the liquid component of the thermostatic charge will be in contact with the insert 44.

When the majority of the liquid component of the thermostatic charge within the chamber c is in contact with the high conductivity insert member 44, such as would be the case when the valve is in truly upright position with its diaphragm substantially horizontal, the speed of response of the charge would be relatively rapid and the valve would be responsive primarily to changes in the temperature of the suction line itself. However, if greater superheat were desired, this could be accomplished by enlarging the insert member 44 and increasing the size of its dished or cup-like upper face 44', so that the entire charge could be contained therein. If lower superheats were desired, so that a relatively large portion of the evaporator would be filled with refrigerant and a relatively small portion assigned to the function of superheating the suction gas, the valve would then be tilted away from the vertical with a greater portion of the charge subjected to the ambient temperature surrounding the valve and the temperature of the relatively hot liquid entering the inlet chamber of the valve from the conduit D. As to this portion of the thermal-charge, the temperature of the suction line H would only be effective to the extent of the heat transmitted by conductivity through the metallic walls of the valve body itself. Thus, for a given suction gas temperature, there would be an average higher pressure within the thermostatic chamber c, and the valve would be biased to a greater extent in the opening direction forwarding more refrigerant to the evaporator. As the temperature of the refrigerated space is reduced, the overall temperature average in the surface of the liquid component of the temperature responsive charge would be consequently slightly reduced due to the lower suction line temperature imposed upon the insert member 44, producing an attendant slight reduction in pressure within the chamber c, thereby producing a slight throttling of liquid, which, in a sense, anticipates the control-producing conditions and starts a very gradual movement of the valve pin 31 toward seated position and thereby achieving a self-damping or compensatory action which achieves an appreciable anti-hunting effect.

As the refrigerated space or medium approaches the temperature of the refrigerant, the head pressure on the compressor is materially reduced with a constant reduction in the temperature of the liquid flowing into the conduit D. This, in turn, reduces the temperature of the valve casing and tends to reduce the temperature of the insert member 44 to a further extent with a consequent reduction in the opening bias imposed upon the valve pin, thereby compensating for load differences to achieve an excellent operating cycle and more nearly approximating the desired conditions within the evaporator through the agency of a single, simple control element.

I have also found that it is possible to employ a valve E", as shown in Figure 9, which is substantially similar in all respects to the valve E, except that the end cap 36" is provided with a long, flexible tube 46, opening into the chamber c", which, in this modification, will obviously be uncharged. The tube 46 is bent intermediate its ends into one or more helical turns, as at 47, to facilitate bending and adjustment, as will presently more fully appear, and at its other end the tube 46 extends through, and is welded or otherwise hermetically sealed in, the top member 48 of a flat, elongated sump or chamber 49 preferably constructed of two companion-shaped cap-like members 50, each substantially similar in shape to the cap member 36' and peripherally welded together, as at 51. The lower cap member 50 is preferably provided with an insert 52 of substantially high thermal conductivity and similar in all respects to the insert 44 of the previously described valve E'. If desired, the upper or internal face of the insert 52 may be provided with a plurality of small recesses or pockets 53 which will retain minimum quantities of the thermally responsive member and permit the chamber 49 to be tilted to a substantially sharp angle at which all of the temperature-responsive charges will be out of contact with the inserted element 52, except for the small quantities of temperature-responsive material retained in the recesses 53 and thereby providing a control element having an especially wide range of adjustment.

As has been indicated above, it is also possible to use as a thermostatic charge a liquid having an absorbed dissimilar gas. The function of such charge has been found to be substantially similar to a vaporizable liquid, although charges of the absorbed gas type seem to be slightly more efficient when employed upon absorption refrigeration systems, in which case the thermal-charge may be substantially identical with the refrigerant actually employed in the system. For some applications, it also seems desirable to employ a thermal-charge in the form of a solid having an absorbed gas, in which case the solid is inserted as a flake or powder, which will, in a manner of speaking, flow to one side or the other as the valve is tilted, very much in the manner of the liquid charges previously discussed.

In refrigeration installations where characteristics of the system preclude the possibility of a rapid change in the evaporator condition, it will be desirable to provide for a control cycle which is somewhat insensitive, so that over-traveling of the valve and consequent hunting or cycling is minimized. This practice is dictated by the relative relationships of the frequency of response of the evaporator to the control condition as imposed on the frequency of response of the controller to the evaporator change. This may definitely be designed in cycles per hour, per minute, or, in other words, as a function of time. Unless these frequencies are carefully chosen, so that the frequency of the valve in its natural speed of response is remote from the natural frequency of response to the evaporator or one of its harmonics, we may frequently get an inter-hunting of the control on the system which will result in the alternate flooding and starving of the evaporator. Among its other valuable functions, this valve indirectly integrates the rate of change of the back pressure with respect to the rate of change of the temperature of the refrigerated space.

Control valves constructed in accordance with my present invention are uniquely adapted for meeting such installation requirements, since it is possible to form the end cap of composite materials chosen carefully to minimize the critical frequency conditions, or entire top cap made of one piece of a material of relatively low conductivity which tends to lower the speed of response and consequently achieve a frequency which will not beat or hunt with the main evaporator frequency. On the other hand, the entire end cap may be made of a single material of relatively high conductivity for use where high evaporator frequencies and rapid changes of load must be accommodated.

It will be evident that, by my invention, I provide a control valve of extreme simplicity and of a design lending itself readily to quantity production methods. In addition, the valve-seating structure of my invention is uniquely designed to provide perfect alignment for and maintenance of correct seating pressures on the materials used. The valve is designed primarily for controlling refrigerant flow to evaporators in so-called "package" units, in which the valve is applied as a part of the factor production methods. The use of all metal parts and the absence of unsealed joints makes the valve especially suitable for low temperature application in connection with ice-cream and frosted food cabinets.

While not here specifically shown, it will be understood that the valve may be placed on the suction line adjacent to the evaporator, so that the ambient temperature is that of the refrigerated space, and it should also be understood that other changes and modifications in the form, construction, arrangement, and combination of the several parts of the valve may be made and substituted for those herein shown and described without departing from the nature and principle of my invention.

Having thus described my invention, what I claim and desire to secure by Letters Patent is,

1. In combination with a refrigerating system including an evaporator having a suction line and means for supplying refrigerant to the evaporator, a control valve having an actuating chamber tiltably mounted on the suction line and charged with a motile temperature-responsive substance, whereby the temperature responsive effect of such substance will change as the chamber is tilted, the chamber having a wall provided with an insert of dissimilar material directly in contact with the line.

2. A thermostatic valve including a valve-body having suitably connected inlet and outlet chambers and throttling means operatively interposed therebetween, a diaphragm actuatingly connected to the throttling means, an imperforate cap-like member formed of material having relatively low thermal conductivity, said cap-like member being hermetically sealed against the diaphragm face forming an enclosed chamber and being provided with an insert portion formed of material of relatively high thermal conductivity, and a thermal-charge disposed within said enclosed chamber and adapted to exert a variable thermostatic effect upon the diaphragm depending upon the angle at which the valve-body and its associated diaphragm is tilted.

3. A thermostatic valve including a valve-body having suitably connected inlet and outlet chambers and throttling means operatively interposed therebetween, a diaphragm actuatingly connected to the throttling means, an imperforate cap-like member formed of material having relatively low thermal conductivity, said cap-like member being hermetically sealed against the diaphragm face forming an enclosed chamber and being provided with an insert portion formed of material of relatively high thermal conductivity, said insert having upon its interior face a plurality of small cavities, and a thermal-charge disposed within said enclosed chamber and adapted to exert a variable thermostatic effect upon the diaphragm depending upon the angle at which the valve-body and its associated diaphragm is tilted.

4. In combination with a refrigerating system including an evaporator, a suction line and means for supplying refrigerant to the evaporator, a control valve and mounting means for holding said control valve on said suction line in position to be effected by temperature changes in the latter, said valve including a chamber having a relatively large area in one plane and a relatively small area in a plane transverse to the plane of the large area, said chamber being filled with a free flowing material having a component in gaseous phase and a component in non-gaseous phase, the material being of such character that the ratio of said components varies with slight changes in temperature, said valve being so mounted on said suction line that the plane of the large area makes a selected angle with the horizontal, such angularity of mounting determining the degree of sensitivity, and said mounting means being adapted to permit angular adjustment of the valve in relation to the suction line.

5. In combination with a refrigerating system including an evaporator, a suction line and means for supplying refrigerant to the evaporator, a control valve having a chamber and mounting means for holding the chamber on the suction line in position to be effected by temperature changes in the latter, said chamber having a relatively large area in one plane and a relatively small area in a plane transverse to the plane of the large area and being filled with a free flowing material having a component in gaseous phase and a component in non-gaseous phase, the material being of such character that the ratio of said components varies with slight changes in temperature, said chamber being so mounted on the suction line that the plane of the large area makes a selected angle with the horizontal, such angularity of mounting determining the degree of sensitivity, and said mounting means being adapted to permit angular adjustment of the valve in relation to the suction line.

6. In combination with a refrigerating system including an evaporator, a suction line and means for supplying refrigerant to the evaporator, a control valve and mounting means for holding said control valve on said suction line in position to be effected by temperature changes in the latter, said valve including a chamber having a relatively large area in one plane and a relatively small area in a plane transverse to the plane of the large area, said chamber being partially filled with a volatile liquid having a component in gaseous phase and a component in liquid phase, the liquid being of such character that the ratio of said components varies with slight changes in temperature, said valve being so mounted on said suction line that the plane of the large area makes a selected angle with the horizontal, such angularity of mounting determining the degree of sensitivity, and said mounting means being adapted to permit angular adjustment of the valve in relation to the suction line.

7. In combination with a refrigerating system including an evaporator, a suction line and means for supplying refrigerant to the evaporator, a control valve having a chamber and mounting means for holding the chamber on the suction line in position to be effected by temperature changes in the latter, said chamber having a relatively large area in one plane and a relatively small area in a plane transverse to the plane of the large area and being partially filled with a volatile liquid having a component in gaseous phase and a component in liquid phase, the liquid being of such character that the ratio of said components varies with slight changes in temperature, said chamber being so mounted on the suction line that the plane of the large area makes a selected angle with the horizontal, such angularity of mounting determining the degree of sensitivity, and said mounting means being adapted to permit angular adjustment of the valve in relation to the suction line.

PARKE H. THOMPSON.